United States Patent
Chandra et al.

(10) Patent No.: US 10,496,622 B2
(45) Date of Patent: Dec. 3, 2019

(54) SYSTEM AND METHOD FOR REAL-TIME DATA WAREHOUSE

(71) Applicant: Futurewei Technologies, Inc., Plano, TX (US)

(72) Inventors: Alex Elisa Chandra, Plano, TX (US); Mark Brown, Little Elm, TX (US); Debashis Bhattacharya, Plano, TX (US); Alan Gatherer, Richardson, TX (US)

(73) Assignee: Futurewei Technologies, Inc., Plano, TX (US)

( * ) Notice: Subject to any disclaimer, the term of this patent is extended or adjusted under 35 U.S.C. 154(b) by 684 days.

(21) Appl. No.: 15/169,094

(22) Filed: May 31, 2016

(65) Prior Publication Data
US 2017/0103093 A1    Apr. 13, 2017

Related U.S. Application Data

(60) Provisional application No. 62/239,707, filed on Oct. 9, 2015.

(51) Int. Cl.
| | | |
|---|---|---|
| *G06F 16/22* | (2019.01) | |
| *G06F 16/2455* | (2019.01) | |
| *G06F 9/48* | (2006.01) | |
| *G06F 16/245* | (2019.01) | |
| *G06F 16/25* | (2019.01) | |

(52) U.S. Cl.
CPC ........... *G06F 16/2219* (2019.01); *G06F 9/48* (2013.01); *G06F 16/245* (2019.01); *G06F 16/2455* (2019.01); *G06F 16/25* (2019.01)

(58) Field of Classification Search
None
See application file for complete search history.

(56) References Cited

U.S. PATENT DOCUMENTS

| | | | |
|---|---|---|---|
| 4,386,399 A | 5/1983 | Rasala et al. | |
| 8,619,800 B1 | 12/2013 | Finney et al. | |
| 9,135,581 B1 * | 9/2015 | Beckford | G06Q 10/04 |
| 2003/0140123 A1 | 7/2003 | Master et al. | |

(Continued)

FOREIGN PATENT DOCUMENTS

| | | |
|---|---|---|
| CN | 101004727 A | 7/2007 |
| CN | 101212451 A | 7/2008 |

(Continued)

OTHER PUBLICATIONS

"Open Event Machines Introduction," Rev 1.0, May 31, 2013, (available at http://sourceforge.net/projects/eventmachine/files/Documents/), pp. 39.

(Continued)

*Primary Examiner* — Richard L Bowen
(74) *Attorney, Agent, or Firm* — Slater Matsil, LLP

(57) ABSTRACT

A method includes receiving, by a real-time Data Warehouse (rDW) from a first task, a first dataset and spreading the first dataset to produce a first plurality of objects, where the first plurality of objects includes a first object and a second object. The method also includes storing the first object in a first location in an rDW data repository and storing the second object in a second location in the rDW data repository.

22 Claims, 10 Drawing Sheets

(56) References Cited

U.S. PATENT DOCUMENTS

| | | |
|---|---|---|
| 2003/0142105 A1 | 7/2003 | Lavelle et al. |
| 2004/0064682 A1 | 4/2004 | Nguyen et al. |
| 2004/0136241 A1 | 7/2004 | Rapp et al. |
| 2005/0025169 A1 | 2/2005 | Douady et al. |
| 2011/0289270 A1 | 11/2011 | Bell, Jr. et al. |
| 2013/0054546 A1 | 2/2013 | Solihin |
| 2013/0304693 A1* | 11/2013 | Jaeger .............. G06F 17/30563 707/602 |
| 2014/0149355 A1* | 5/2014 | Gupta .............. G06F 17/30008 707/652 |
| 2014/0180675 A1 | 6/2014 | Neuhauser et al. |
| 2014/0351826 A1 | 11/2014 | Llamas |
| 2014/0372699 A1 | 12/2014 | Desai et al. |
| 2015/0205845 A1* | 7/2015 | Ocher .............. G06F 17/30563 707/602 |
| 2015/0347542 A1* | 12/2015 | Sullivan .......... G06F 17/30563 707/602 |
| 2016/0103707 A1 | 4/2016 | Bhattacharya et al. |
| 2016/0242142 A1 | 8/2016 | Boyette et al. |
| 2017/0017394 A1 | 1/2017 | Wang et al. |
| 2017/0103093 A1 | 4/2017 | Chandra et al. |

FOREIGN PATENT DOCUMENTS

| | | |
|---|---|---|
| CN | 102662994 A | 9/2012 |
| CN | 103106174 A | 5/2013 |
| EP | 2312463 A1 | 4/2011 |
| WO | 2007056343 A2 | 5/2007 |
| WO | 2012146471 A1 | 11/2012 |
| WO | 2013048929 A1 | 4/2013 |

OTHER PUBLICATIONS

"Open Event Machine: Introduction," Rev 1.0, May 2013, 39 pgs.

* cited by examiner

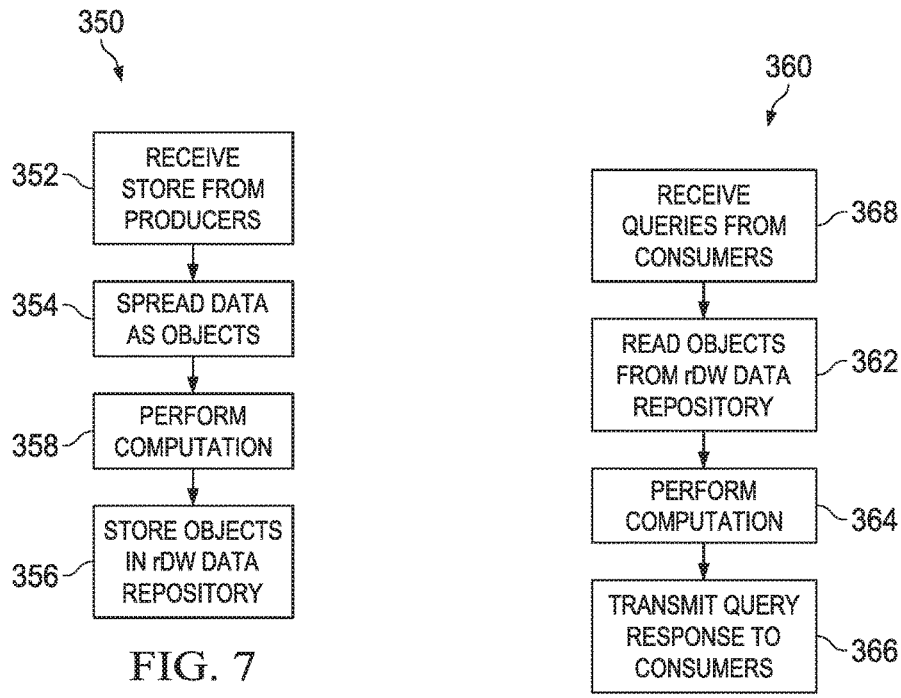
FIG. 7
FIG. 8
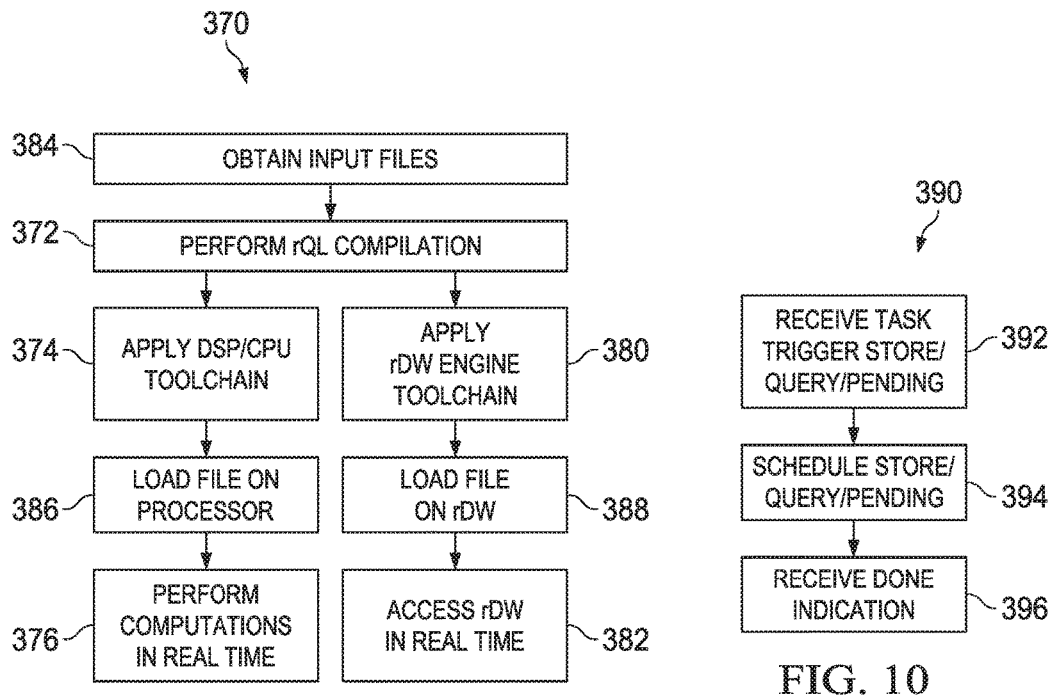
FIG. 9
FIG. 10

SYSTEM AND METHOD FOR REAL-TIME DATA WAREHOUSE

This application claims the benefit of U.S. Provisional Application Ser. No. 62/239,707 filed on Oct. 9, 2015, and entitled "Real-Time Data Warehouse: Intelligent, Self-Managed, Semantics Aware Storage for ICT," which application is hereby incorporated herein by reference.

TECHNICAL FIELD

The present invention relates generally to a system and method of data storage, and, in particular embodiments, to a system and method for real-time data warehouse.

BACKGROUND

Bulk memory may be used inefficiently, with a significant amount of memory containing old data sitting idle that cannot be reused. Bulk memory includes off system-on-a-chip (SoC) memory, such as double data rate (DDR) memory and flash memory, and large, on-SoC memory storage, such as synchronous dynamic random access memory (SRAM) or embedded dynamic random access memory (DRAM). Bulk memory may be used to simply hold bits of data. In bulk memory, all bits may be treated similarly, and are first written to and possibly later read out. Data may be multiply buffered to meet real-time throughput and latency constraints during processing, leading to significant power and area usage. Global memory maps of all available bulk memories and organizations may be used by some technologies. Also, in bulk memory, the location of data may be statically determined. Manual optimization of memory usage via overlays of data may be used in real-time embedded systems. However, manual optimization may be difficult and time consuming to create, and may have poor code reuse properties. Optimizing bulk memory in advance may be problematic, because the memory usage pattern may not be known in advance. Also, updating bulk memory may be expensive. Global memory mapping is tedious, and makes assumptions about future usage. Additionally, global memory mapping may lead to holes, in which common addresses are shared, but data paths are not shared.

In the information technology (IT) domain, the concept of data warehouse may be used. However, IT data warehouses are poorly suited for information and communications technology (ICT). IT data warehouses, such as Hadoop, have a primary focus on handling a large volume of data and efficient storage and retrieval of disk-like media. IT data warehouses have modularity and isolation. IT might not have significant real-time requirements. In ICT, storage and data handling requirements are highly sensitive to latency, throughput, and data organization.

SUMMARY

In accordance with an embodiment of the present invention, a method includes receiving, by a real-time Data Warehouse (rDW) from a first task, a first dataset and spreading the first dataset to produce a first plurality of objects, where the first plurality of objects includes a first object and a second object. The method also includes storing the first object in a first location in an rDW data repository and storing the second object in a second location in the rDW data repository.

In accordance with another embodiment of the present invention, a method includes receiving, by a real-time Data Warehouse (rDW), a first query and reading a first object from a first location in an rDW data repository and reading a second object from a second location in the rDW in accordance with the first query to produce a first query result. The method also includes transmitting, by the rDW to a first task, the first query result.

In accordance with an additional embodiment of the present invention, a method includes obtaining software definitions and obtaining hardware definitions. The method also includes performing, by a first processor, real-time Query Language (rQL) compilation on the software definitions and the hardware definitions to produce data warehouse instructions and data warehouse application structures and applying a toolchain to the data warehouse instructions to produce a binary file. Additionally, the method includes loading the binary file on a real-time data warehouse (rDW) engine of an rDW.

In accordance with another embodiment of the present invention, a method includes receiving, by an rDW engine from a scheduler, a first task schedule for a first task, where the first task depends on a second task and determining whether the second task has been completed. The method also includes upon determining that the second task has not been completed, adding the first task to a pending list as a pending task and upon determining that the second task has been completed, performing the first task.

In accordance with an additional embodiment of the present invention, a system includes a real-time Data Warehouse (rDW), including on system-on-a-chip (SoC) memory and a first rDW engine coupled to the on SoC memory. The rDW also includes a second rDW engine coupled to the first rDW engine and a scheduler coupled to the first rDW engine.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 7 illustrates a flowchart for an embodiment method of storing data in an rDW;

FIG. 8 illustrates a flowchart for an embodiment method of querying data in an rDW;

FIG. 9 illustrates a flowchart for an embodiment method of automated code generation for an rDW;

FIG. 10 illustrates a flowchart for an embodiment method of task scheduling in an rDW;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
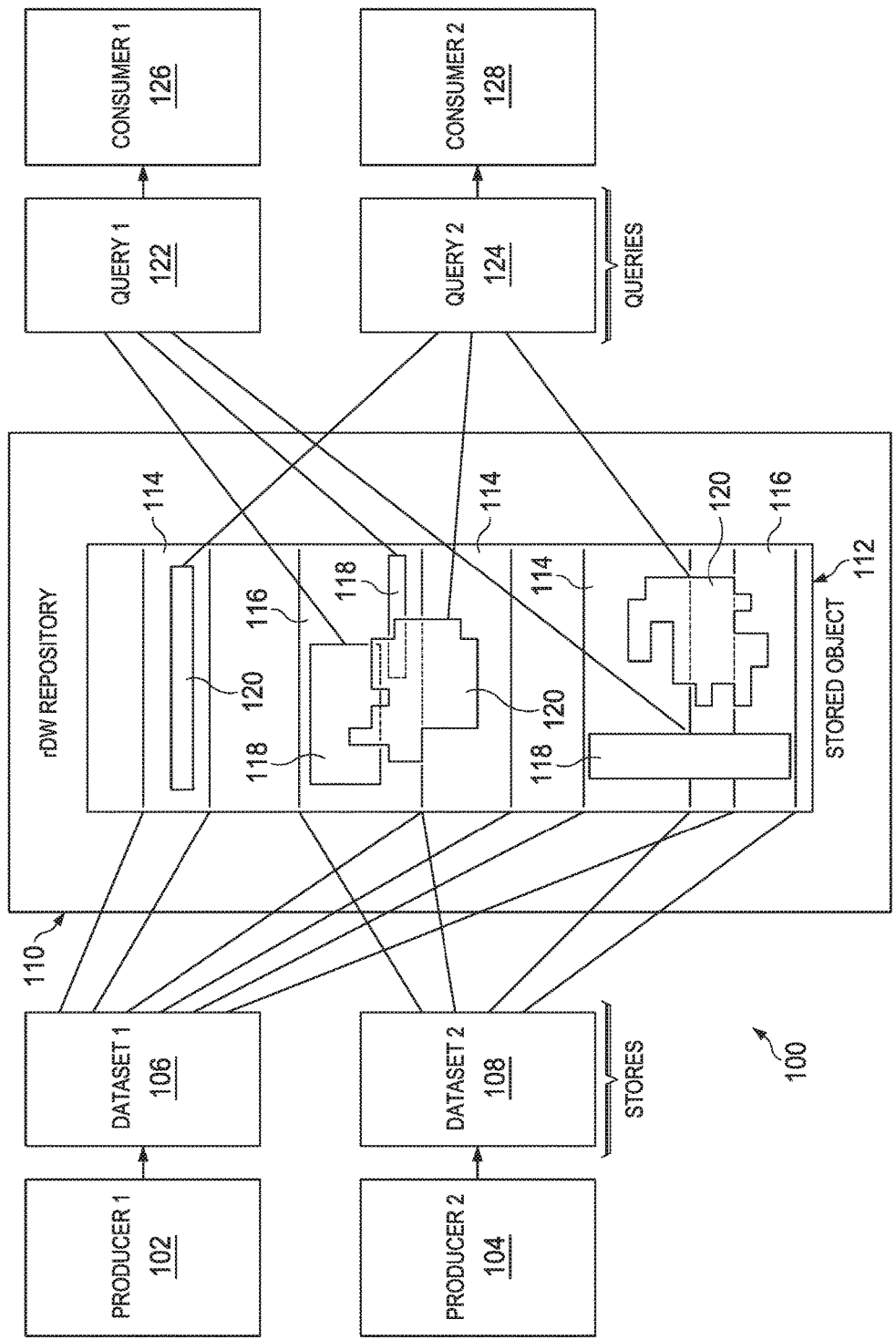
FIG. 1 illustrates a logical view of a real-time Data Warehouse (rDW) system.

It should be understood at the outset that although an illustrative implementation of one or more embodiments are provided below, the disclosed systems and/or methods may be implemented using any number of techniques. The disclosure should in no way be limited to the illustrative implementations, drawings, and techniques illustrated below, including the exemplary designs and implementations illustrated and described herein, but may be modified within the scope of the appended claims along with their full scope of equivalents.

An embodiment real-time Data Warehouse (rDW) system and method includes efficient storage management and methods for defining, accessing, and managing stored data in a real-time system. In an embodiment, storage is decoupled from computation. Service level agreements (SLAs) may be designed for use in specifying real-time performance requirements for an rDW. In an embodiment, memory access methods suitable for dataflow processing are defined. Stalls may be caused, for example, by reading data from bulk memory or from cache misses. Also, an embodiment method includes on-the-fly data aggregation and reorganization to maximize compute engines' efficiency by reducing the incidence of stalls. An embodiment rDW eliminates global addressability of memory in, or connected to a system-on-a-chip (SoC) and facilitates the automated delivery of reorganized data satisfying predefined conditions. Data reorganization may use scatter/gather. Also, an embodiment rDW reduces penalties due to physical limitations inherent in bulk memory technologies, such as bank conflicts and read-write turn-around. In an embodiment rDW, data is delivered just as it is needed by compute engines.

An embodiment rDW includes hardware, firmware, and software. Storage and retrieval of data in bulk memory may be abstractly defined using rDW data definition and rDW store/query definition. An rDW data definition (rDD) may be implemented using a general programming language, such as C/C++, or a domain-specific programming language (DSL). An rDW store/query definition (rQD) may be implemented using real-time query language (rQL), which is a DSL. The data definition may be more general than a two-dimensional (2D) table, and any data organization allowed in a general purpose programming language, such as C/C++, may be used. Data entries may be organized in a hierarchical structure which is not relational. The rDD and rQD may be defined and described as formats of data to be stored for producers and queried for consumers. Through the process of rDD and rQD compilation, a beneficial organization of data inside bulk storage may be driven by the real-time performance goals for specific applications.

Unlike random access memory, storage in real-time systems is focused on data load and store operations. An rDW may be focused on the efficient handling of complex data objects and slices and aggregations via scatter and gather operations. On-the-fly data reorganization transforms data formats efficiently produced by the producers to data formats which may be efficiently accessed by consumers.

An embodiment rDW optimizes data movement by using rQL queries to define the set of desired data. Also, an embodiment rDW automates remapping of references internal to data objects to accommodate the serialization and deserialization of complex objects. An embodiment rDW may restrict random memory accesses to distant memories, requiring the use of store and query mechanisms for distant memory accesses. In an embodiment rDW, data movement, aggregation, and reorganization related processing may be offloaded from compute engines to specialized hardware accelerators. In an embodiment, an rDW minimizes multiple buffering overhead, and facilitates large query results to be automatically split up into multiple, finer granularity packets. An embodiment rDW employs various techniques to reduce data volume for storage and movement purposes.

FIG. 1 illustrates the rDW system 100, which includes the rDW repository 110 for storing stored objects 112. Data is produced by producers, including producer 102 and producer 104. Two producers are pictured, but many more producers may be used. Different producers, which may be different compute engines, produce data in different formats. The compute engines may be software programmable processors or hardware accelerators. For example, each producer may produce data in a format which is most efficient for that producer. Producer 102 stores dataset 106, which is scattered or spread for storage, in stored objects 112 in the rDW repository 110 in form of objects 114. Similarly, data produced by producer 104 is stored in dataset 108 using scattering or spreading in the form of storage objects 116. The data does not need to be stored in a two-dimensional (or n-dimensional) table, and may be stored in an arbitrary shape. Objects produced by a single producer may be stored in different areas of stored objects 112. In one example, data produced by different producers may be adjacent, but non-overlapping.

The objects are read out from stored objects 112 of the rDW repository 110 by different consumers. Different consumers may use data in formats which are different than both the formats of the producers and the formats used by other consumers. For example, each consumer may read out data in a format which is best suited for itself. The data which is read by a particular consumer originates from different producers. Objects read by different consumers may overlap in stored objects 112. Stored objects 118 are gathered and aggregated by query 122 for consumer 126, and stored objects 120 are gathered and aggregated by query 124 for consumer 128. Data may be read out in parallel by different consumers. The stored objects which are read out from the rDW repository 110 may have an arbitrary format or shape.

Figure 2:
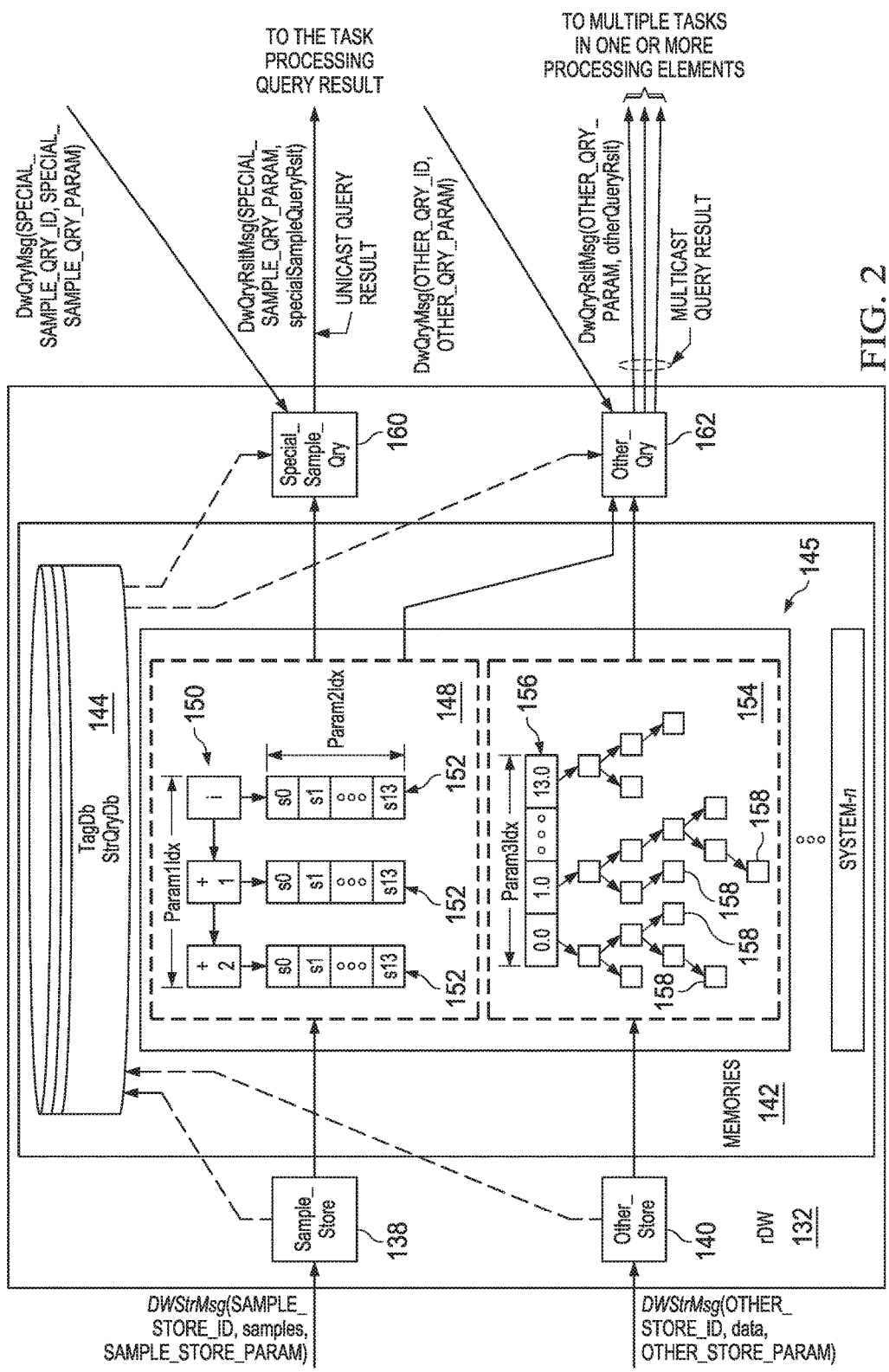
FIG. 2 illustrates an embodiment rDW system.

An embodiment rDW recognizes and utilizes the flow of data. FIG. 2 illustrates the rDW 132, which performs sample store, sample queries, other store, and other queries. Memory 142 may be on-SoC memory and/or off-SoC memory. Memory 142 includes one or more systems 145. For example, there may be n systems. Also, memory 142 includes database 144, which includes a tag database (TagDb) for labeling data and a store and query database (StrQryDb) with information for storing and querying data. Stores in the rDW 132 includes Sample Store 138, which stores data in a table, and Other_Store 140, which stores data in a more customized configuration, for example using a tree structure. Additionally, queries in the rDW 132 include Special_Sample_Qry 160 and Other_Query 162.

A data warehouse store request message (DwStrmsg), which includes the arguments SAMPLE_STORE_ID (the identifier of Sample Store 138), samples data to be stored, and SAMPLE_STORE_PARAM (which indicates additional parameters, in this example Param1Idx and Param2Idx values), triggers execution of Sample Store 138. Sample Store 138 stores samples in table 148 in systems 145. The samples are stored using two specified parameter indices, Param1Idx and Param2Idx. Param1Idx indicates rows 150, and may have the values of i, i+1, and i+2. Also, Param2Idx indicates the columns in columns 152, which may have 14 values, s0, s1, . . . , s13. Information on the storage and labeling of the stored data is sent to database 144 for use in future queries.

A data warehouse store request message (DwStrMsg), which includes OTHER_STORE_ID (the identifier of Other_Store 140), data to be stored, and OTHER_STORE_PARAM (which indicates additional parameter(s), in this example Param3IDx), triggers execution of Other_Store 140. Other_Store 140 stores the data using tree structure 154 in system 145. Tree structure 154 includes sets of roots 156 which have parameters Param3IDx including (0,0), (1,0), . . . , (13,0). The tree is then traversed using tree nodes 158 to store the data. The tree has a different hierarchy level. Other_Store 140 also stores storage information and tags in database 144.

Sample queries are accessed using Special_Sample_Qry 160. A query is initiated when Special_Sample_Qry 160 receives a data warehouse query request message (DwQryMsg) with a special sample query ID of SPECIAL_SAMPLE_QRY_ID and a special sample query parameter of SPECIAL_SAMPLE_QRY_PARAM. Special_Sample_Qry 160 also receives tag and query information from database 144. Also, Special_Sample_Qry 160 queries table 148 to obtain a sample result. The unicast query result is output in a data warehouse query result message (DwQryRsltMsg) to the task processing the query result. The task processing the query result may be the same task which queried the data, or it may be a different task. The data query result message includes a special sample query parameter (SPECIAL_SAMPLE_QRY_PARAM) and special sample query result (specialSampleQueryRslt).

Other_Query 162 performs multicast queries. Other_Query 162 receives a data warehouse query message with other query ID (OTHER_QRY_ID) and other query parameter (OTHER_QRY_PARAM) in a query request. Also, Other_Query 162 receives tag and query information from database 144 for use in performing the query. Other_Query 162 performs a query using tree structure 154. A multicast query result is obtained, with results sent to multiple tasks in one or more compute engines. The output message is a data query results message with the parameters other query parameter (OTHER_QRY_PARAM) and other query result (otherQueryRslt).

Figure 3:
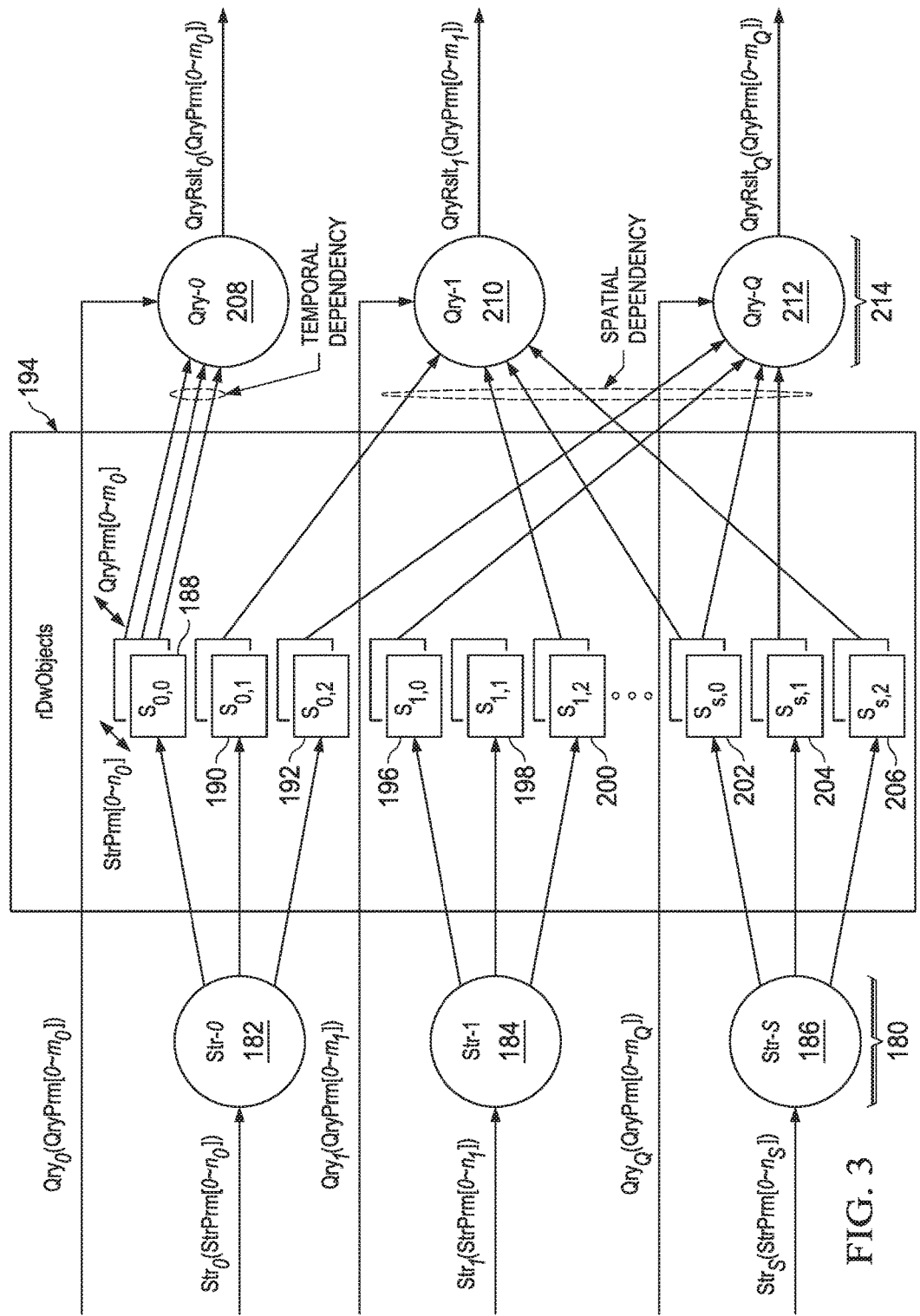
FIG. 3 illustrates embodiment store and query operations on rDW objects.

An embodiment rDW recognizes data semantics, such as the data relationships and dependencies, which are defined by store and query procedures. FIG. 3 illustrates the use of data dependencies, where different data is stored using different functions. Data is stored in rDW objects 194. There may be dependencies among the stored rDW objects. Storage requests are received by stores 180, S stores, including store (Str) 182, store 184, and store 186. Store 182 receives a store request Str0(StrPrm[0~n0]), and stores the data in objects 188, 190, and 192 in rDW objects 194. Also, store 184 receives a store request Str1(StrPrm[0~n1]), which stores the data in objects 196, 198, and 200. Additionally, store 186 receives a store request StrS(StrPrm[0~nS]), and stores the data in objects 202, 204, and 206.

Queries are received by queries 214 including Q queries, including query 208, query 210, and query 212. Different queries may access data from overlapping stores. One query may access data from one store or from multiple stores. The queries might query objects with temporal dependencies, such as query 208, or spatial dependencies, such as queries 210 and 212. Although temporal dependencies and spatial dependencies are illustrated for separate queries, one query may have a mix of temporal and spatial dependencies. Query 208 receives Qry0(QryPrm[0~m0]), which is used to query objects having temporal dependencies from object 188. The data has been stored in the same area at different times. The query 208 outputs QryRslt0(QryPrm[0~m0]). Also, query 210 receives Qry1(QryPrm[0~m1]), which is used to query objects with spatial dependencies from objects 190, 200, 202, and 206. The data originates from different spatial storage areas. The data is output in the form of QryRslt1 (QryPrm[0~m1]). Similarly, query 212 receives QryQ(QryPrm[0~mQ]) for objects having spatial dependencies. Query 212 retrieves data from objects 192, 196, 202, and 204. Also, query 212 outputs QryRsltQ(QryPrm[0~mQ]).

Metadata may be used to represent the manipulation and utilization of dependencies. Additional details on the use metadata in storing and querying data are discussed in U.S. patent application Ser. No. 14/877,155 filed on Oct. 7, 2015, and entitled "System and Method for System on a Chip," which application is hereby incorporated herein by reference.

Figure 4:
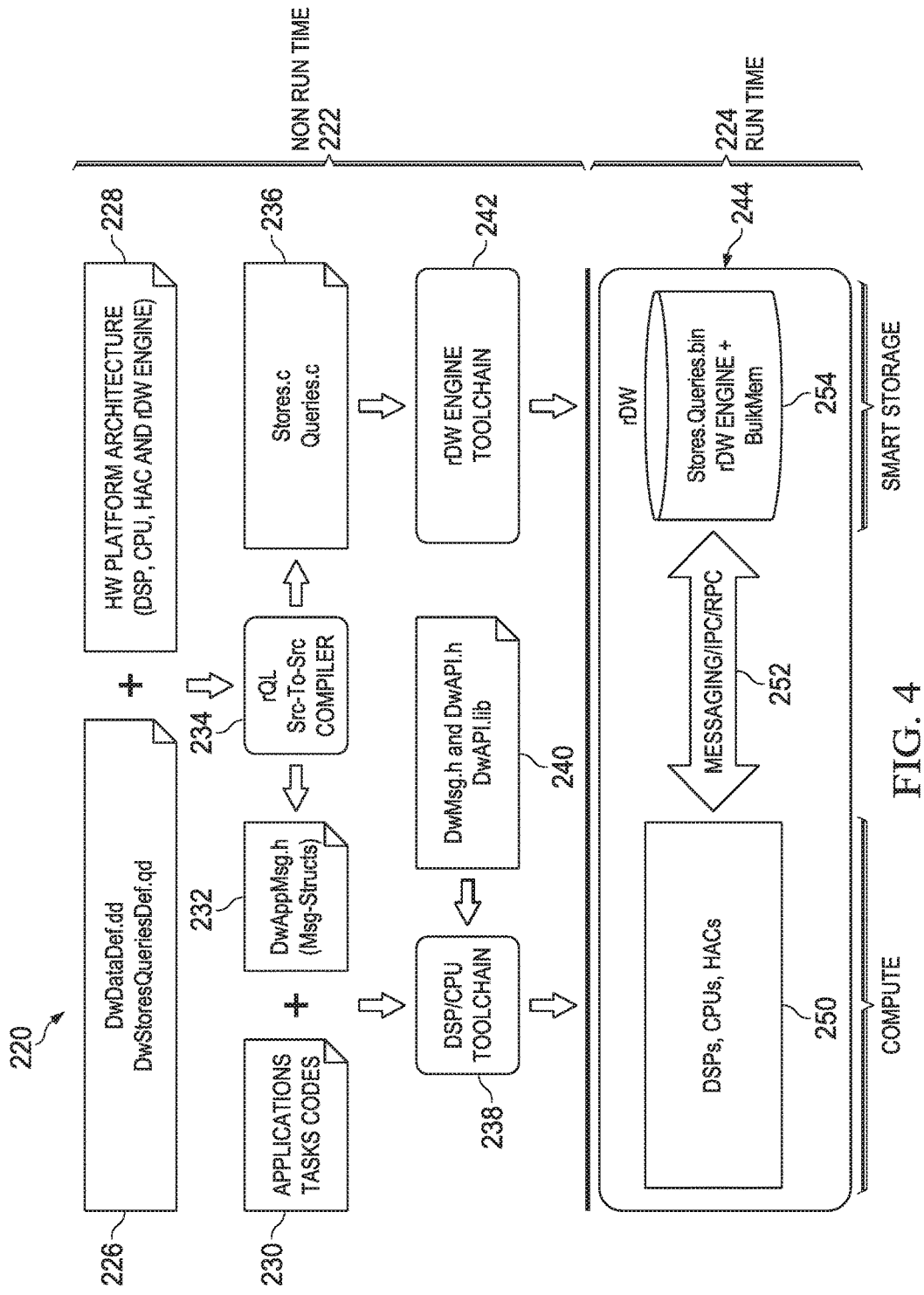
FIG. 4 illustrates an automated infrastructure for an embodiment rDW system.

An rDW may be supported by an automated infrastructure that includes an rQL compiler. The rQL compiler produces optimized and standardized codes, which may reduce engineering costs. FIG. 4 illustrates automated infrastructure 220 for generating and running code in an rDW. Automated infrastructure 220 includes non-runtime environment 222, where code is generated before runtime and runtime environment 224, where code is executed by one or more rDW engines at runtime.

Non-runtime environment 222 includes data definitions 226 and hardware (HW) platform architecture 228. Data definitions 226 are developed by an application. Data definitions 226 include data warehouse data definitions (DwDataDef.dd) and data warehouse store and query definitions (DwStoresQueriesDef.qd). DWDataDef.dd may include data definitions, which are basic parameters describing the system. The system may be described logically, defining a repository of data objects for that specific system. The data definitions for system parameters may be given by the following code segment, which defines a system with seven parameters and a set of valid ranges which are used to index array elements of the data objects:

```
// System Param
typedef struct {
    UINT8 SYS_PARAM_1;
    UINT8 SYS_PARAM_2;
    UINT8 SYS_PARAM_3;
    UINT8 SYS_PARAM_4;
    UINT8 SYS_PARAM_5;
    UINT8 SYS_PARAM_6;
    UINT8 SYS_PARAM_7;
    RANGE PARAM_1_RANGE 0..(SYS_PARAM_1 - 1);
    RANGE PARAM_2_RANGE 0..(SYS_PARAM_2 - 1);
    RANGE PARAM_3_RANGE 0..(SYS_PARAM_3 - 1);
    RANGE PARAM_4_RANGE 0..(SYS_PARAM_4 - 1);
    RANGE PARAM_5_RANGE 0..(SYS_PARAM_5 - 1);
    RANGE PARAM_6_RANGE 0..(SYS_PARAM_6 - 1);
    RANGE PARAM_7_RANGE 0..(SYS_PARAM_7 - 1);
} SystemParamT;
```

An example type overlay is given by the following code segment, which defines types used to define data objects stored within the system's repository:

```
// Sample type overlays
typedef FLOAT SAMPLE_T[2];
template<SystemParamT T>
struct SampleSetT{
    // Define an array of samples dynamically
    // dimensioned by four of the system parameters.
    SAMPLE_T samples[T.SYS_PARAM_1][T.SYS_PARAM_2]
                    [T.SYS_PARAM_3][T.SYS_PARAM_7];
```

```
};
struct CommonParamTblT { ... };
```

The system data objects may be created dynamically, for example using the following code segment:

```
// System
template<SystemParamT T>
// Data objects dynamically dimensioned by system parameters.
typedef struct {
    CommonParamTblT commonParamTbl[T.SYS_PARAM_7][T.SYS_PARAM_1];
    SampleSetT<T> sampleSetDb[T.SYS_PARAM_4][T.SYS_PARAM_5]
                             [T.SYS_PARAM_6];
} SystemT;
```

Also, rDW data objects may be created and initialized, for example using the following code segments:

```
// DW Object CREATION & INITIALIZATION example for
// two unique systems.
DwApi_SystemCreate(SystemT<3,4,100,2,12,7,4>,sys,0);
DwApi_SystemCreate(SystemT<2,2,100,2,12,7,4>,sys,1);
```

The rDW provides for the definition of operations to store, update, and query formatted data for data objects created within a system's repository. Examples of these definitions are illustrated below. An example definition which updates a section of a sample database in accordance with the provided indices is:

```
SAMPLE_STORE(UINT16 sysId,
             UINT16 Param1Idx,
             UINT16 Param2Idx,
             SampleSetT<SystemParamT T> Samples)
{
    UPDATE sys[sysId].
        sampleSetDb[PARAM_4_RANGE]
                   [PARAM_5_RANGE]
                   [PARAM_6_RANGE].
        samples[Param1Idx]
               [Param2Idx]
               [PARAM_3_RANGE]
               [PARAM_7_RANGE]
    WITH Samples.samples[Param1Idx][Param2Idx]
                        [PARAM_3_RANGE][PARAM_7_RANGE]
}
```

Another example illustrates a query which selects a portion of the sample database rearranging the indices of the sub-element array to produce a data format conducive to the manner in which the data will be processed:

```
SPECIAL_SAMPLE_QRY (
UINT16 sysId, UINT16 Param4Idx, UINT16 Param5Idx,
UINT16 Param6Idx, UINT16 sampleIdx3List[ ])
{
    SELECT sys[sysId].
        sampleSetDb[Param4Idx]
                   [Param5Idx]
                   [Param6Idx].
        samples[0..10]
               [PARAM_2_RANGE]
               [sampleIdx3List]
               [PARAM_7_RANGE]
    // Returns third index first, first index third
```

```
    ORDER BY INDEX
        sys[sysId].sampleSetDb.samples {2, 1, 0, 3}
}
```

Queries may be triggered in a variety of manners. A query may be triggered by any entity. For example, queries may be triggered by a standalone query generator or, a consumer, or an rDW engine. In above example, a query is triggered by receiving a query request message. In another example, a query is auto-triggered. An auto-triggered query is defined based on a triggering condition, or data dependencies. For example, when a data item becomes available, a query is automatically triggered. When the triggering condition is satisfied, the query is automatically scheduled for execution. Thus, the result is automatically sent to the consumers who are waiting for the result.

In another example, a WHEN condition is used to specify a triggering condition of an auto-triggered query. Conditions are evaluated each time a store request message related to the query is received. A store request message carries, for example, StoreDef_Id, which may be used to determine other QueryDef_Ids that may depend on this data. An example of an auto-triggered query is given by:

```
SAMPLE_AUTO_TRIGGERED_QUERY ( ){
    SELECT sys[0].
        sampleSetDb[4]
                   [5]
                   [6].
```

```
        samples[0..10]
                [PARAM_2_RANGE]
                [sampleIdx3List]
                [PARAM_7_RANGE]
        WHEN sampleIdx3List = 10..15
}
```

Hardware (HW) platform architecture 228 includes hardware definitions for hardware platforms or processors, such as for digital signal processors (DSPs), central processing units (CPUs), hardware accelerators (HACs), and rDW engines.

The compiler 234, an rQL source (Src)-to-Src compiler, performs compilation based on the data definitions 226 and hardware platform architecture 228. The definitions are optimized from an abstract language to a general purpose language, such as C/C++, to create a header file. The compiler 234 and tool chain 242 may be combined to yield an integrated compiler which directly generates executable binary code from .dd and .qd, and from hardware platform architecture information. When compiled in binary form, the .h files define data structures which are used by the application programmer to construct a query store request and/or a query/store response. Thus, in this example, the compiler generates both source header files and binary object code. In another embodiment, the header files are defined manually, and the compiler generates transformed source code, or the compiler generates binary code. The compilation optimizes the hardware and software definitions. The compiler 234 produces data warehouse application messaging structure 232 and data warehouse instructions 236.

The data warehouse application messaging structure 232 contains message structures (Msg-Structs) in the file Dw.App.Msg.h. The messaging structure 232 is automatically generated by the compiler 234. The messaging structure is used to develop code for messaging between the rDW engine and the rDW. The messaging structure may include system related structures and query related types and structures. In one example, the system related structures include the following:

```
// System related structures
typedef enum {   SampleSetT_DD_ID = 1,
                 CommonParamTblT_DD_ID = 2,
                 SpecialParamTblT_DD_ID = 3,
                 SystemT_DD_ID = 4, ... } DataDefIdT;
struct SystemParamT {
    UINT8 SYS_PARAM_1;
    UINT8 SYS_PARAM_2;
    UINT8 SYS_PARAM_3;
    UINT8 SYS_PARAM_4;
    UINT8 SYS_PARAM_5;
    UINT8 SYS_PARAM_6;
    UINT8 SYS_PARAM_7;
};
struct CommonParamTblT { ... };
template<SystemParamT T> struct SpecialParamTblT
{ ... };
typedef FLOAT SAMPLE_T[2];
template<SystemParamT T>
struct SampleSetT{
SAMPLE_T samples[T.SYS_PARAM_1]
    [T.SYS_PARAM_2]
    [T.SYS_PARAM_3]
    [T.SYS_PARAM_7];
};
typedef UINT16 SystemIdT;
template<SystemParamT T>
struct SystemT     {
    SystemIdT    sysId;
    T            sysParam;
    CommonParamTblT
commonParamTbl[T.SYS_PARAM_7][T.SYS_PARAM_1];
    SampleSetT<T> sampleSetDb[T.SYS_PARAM_4]
    [T.SYS_PARAM_5]
    [T.SYS_PARAM_6];
};
```

Also, the query related types and structures may include:

```
// Query related types and structures
typedef enum {
    SPECIAL_SAMPLE_QRY_ID = 1001,
    OTHER_QRY_ID = 1002 } DwQueryIdT;
typedef enum {
    SPECIAL_SAMPLE_QRY_PARAM_DD_ID = 2001,
    OTHER_QRY_PARAM_DD_ID = 2002 } DwQueryParamDataDefIdT;
typedef enum {
    SPECIAL_SAMPLE_QRY_RSLT_DD_ID = 3001,
    OTHER_QRY_RSLT_DD_ID = 3002 } DwQueryResultDataDefIdT;
struct SPECIAL_SAMPLE_QRY_PARAM_T {
    SystemIdT SysId;
    UINT16 Param4Idx;
    UINT16 Param5Idx;
    UINT16 Param6Idx;
    UINT16 SampleIdx3ListLen;
    UINT16 SampleIdx3List;
};
template <SystemParamT T>
struct SPECIAL_SAMPLE_QRY_RSLT_T {
    // Rearranged indices
    SAMPLE_T SampleResult[T.SYS_PARAM_3]
                         [T.SYS_PARAM_2]
                         [11]
                         [T.SYS_PARAM_7];
};
struct OTHER_QRY_PARAM_T { ... };
template <SystemParamT T>
struct OTHER_QRY_RESULT_T { ... };
typedef union {
    SPECIAL_SAMPLE_QRY_PARAM_T  specialSampleQryP;
    OTHER_QRY_PARAM_T           otherQryP;
```

```
    ...
} DW_QUERY_PARAM_T;
// Store related types and structures
typedef enum {
    SAMPLE_STORE_ID = 5001,
    OTHER_STORE_ID = 5002 } DwStoreIdT;
typedef enum {
    SAMPLE_STORE_PARAM_DD_ID = 6001,
    OTHER_PARAM_DD_ID = 6002 } DwStoreParamDataDefIdT;
struct SAMPLE_STORE_PARAM_T {
    SystemIdT  SysId;
    UINT16     Param1Idx;
    UINT16     Param2Idx;
    SampleSetT<SystemParamT T> Samples
};
struct COMMON_PARAM_TBL_STORE_PARAM_T { ... };
typedef union {
    SAMPLE_STORE_PARAM_T sampleStoreP;
    OTHER_STORE_PARAM_T otherStoreP;
    ...
} DW_STORE_PARAM_T;
```

The data warehouse instructions 236 may include binary data warehouse instructions. In one example, the data warehouse instructions are a .dwi file which is a directly executed, binary, non-real time executable file. The data warehouse instructions may be compiled C code, for example from a Stores.c file for storage instructions and a Queries.c file for query instructions. The generated stores file may indicate how the store engine operates. An example of data warehouse storage engine code is given by:

```
DW_Store_Engine( ) {
    MsgReceive(&strMsg);
    SystemT* pSystem =
        Systems[PARAM(strMsg)->systemId.sysId];
    switch strMsg.storeId {
        case SAMPLE_STORE_ID:
            SAMPLE_STORE(pSystem, strMsg);
            break;
        case OTHER_STORE_ID: ...
        default: ...
```

An example of generated store code is given by:

```
SAMPLE_STORM( SystemT *pSys, StoreMsgT *strMsg )
{
    SAMPLE_T *pSampleData = strMsg->getDataPtr( );
    UINT32 idx1, idx2, idx3, idx4, idx5;
    for (int idx1=0; idx1<pSys->sysParam->SYS_PARAM_4; idx1++)
    {
      for (idx2=0; idx2<pSys->sysParam->SYS_PARAM_5; idx2++)
      {
       for (idx3=0; idx3<pSys->sysParam->SYS_PARAM_6; idx3++)
       {
        for (idx4=0; idx4<pSys->sysParam->SYS_PARAM_3; idx4++)
        {
         for (idx5=0; idx5<pSys->sysParam->SYS_PARAM_7; idx5++)
          {
           pSys->sampleSetDB[idx1][idx2][idx3].
               samples[PARAM(strMsg)->Param1Idx]
                     [PARAM(strMsg)->Param2Idx]
                     [idx4]
                     [idx5] =
               pSampleData[PARAM(strMsg)->Param1Idx]
                     [PARAM(strMsg)->Param2Idx]
                     [idx4]
                     [idx5];
    } } } } }
}
```

An example data warehouse query engine code is given by:

```
DW_Query_Engine( ) {
    MsgReceive(&qryMsg);
    SystemT* pSystem =
        Systems[PARAM(strMsg)->systemId.sysId];
    switch qryMsg.queryId {
        case SPECIAL_SAMPLE_QRY_ID:
            SPECIAL_SAMPLE_QRY(pSystem, qryMsg);
            break;
        case OTHER_QRY_ID: ...
        default: ...
    }
}
```

Also, an example generated special sample query code is given by:

```
SPECIAL_SAMPLE_QRY( SystemT *pSys, QueryMsg_T *qryMsg ){
  // Allocate result message
  UINT32 payloadSize = PARAM(qryMsg)->SampleIdx3ListLen *
                       pSys->sysParam->SYS_PARAM_2 * 11 *
                       pSys->sysParam->SYS_PARAM_7 *
                       sizeof(SAMPLE_T));
  SPECIAL_TBL_QR_MSG_T *pQryRsltMsg = new
      SPECIAL_TBL_QR_MSG_T(payloadSize);
  SAMPLE_T **pQryRsltData = pQryRsltMsg->getDataPtr( );
  // Locate and aggregate data
  UINT32 idx1, idx2, idx3, idx4;
  for (idx1=0; idx1<PARAM(qryMsg)->SampleIdx3ListLen; idx1++)
  {
    for (idx2=0; idx2<pSys->sysParam->SYS_PARAM_2; idx2++)
    {
      for (idx3=0; idx3<11; idx3++)
      {
        for (idx4=0 idx4<pSys->sysParam->SYS_PARAM_7; Idx4++)
        {
          pQryRsltData[idx1][idx2][idx3][idx4] =
            pSys->
              sampleSetDb[PARAM(qryMsg)->Param4Idx]
                         [PARAM(qryMsg)->Param5Idx]
                         [PARAM(qryMsg)->Param5Idx].
                samples[idx3]
                       [idx2]
                       [PARAM(qryMsg)->SampleIdx3List[idx1]]
                       [idx4];
  } } } }
  // Send response message
  MsgSend(HEADER(qryMsg)->responseChannel,
          pQryRsltMsg->Size( ), pQryRsltMsg);
}
```

An example of generated auto-triggered query code is given by:

```
SAMPLE_AUTO_TRIGGERED_QUERY( SystemT *pSys ){
  UINT32 sampleIdx3List[6] = { 10, 11, 12, 13, 14, 15 };
  // Allocate result message
  UINT32 payloadSize = 6 * pSys->sysParam->SYS_PARAM_2 * 11
                       * pSys->sysParam->SYS_PARAM_7
                       * sizeof(SAMPLE_T));
  SAMPLE_AUTO_TRIGGERED_TBL_QR_MSG_T *pQryRsltMsg = new
      SAMPLE_AUTO_TRIGGERED_TBL_QR_MSG_T(payloadSize);
  SAMPLE_T **pQryRsltData = pQryRsltMsg->getDataPtr( );
  // Locate and aggregate data
  UINT32 idx1, idx2, idx3, idx4;
  for (idx1=0; idx1<6; idx1++)
  {
    for (idx2=0; idx2<pSys->sysParam->SYS_PARAM_2; idx2++)
    {
      for (idx3=0; idx3<11; idx3++)
      {
        for (idx4=0; idx4<pSys->sysParam->SYS_PARAM_7; Idx4++)
        {
          pQryRsltData[idx1][idx2][idx3][idx4] =
            pSys->sampleSetDb[4]
                             [5]
                             [6].
              samples[idx3]
                     [idx2]
                     [sampleIdx3List[idx1]]
                     [idx4];
  } } } }
  // Send response message
  MsgSend(HEADER(qryMsg)->responseChannel,
          pQryRsltMsg->Size( ), pQryRsltMsg);
}
```

The data warehouse instructions 236 are converted into a format used by the rDW 254 using rDW engine toolchain 242. The files are stored inside the rDW for use at runtime.

The application (App) task codes 230 are developed by an application. Data warehouse messaging and data warehouse application programming interface (API) 240 may contain files such as DwMsg.h, DwAPI.h, and DwAPI.lib. DSP/CPU toolchain 238 converts application task codes 230, messaging structure 232, and data warehouse messaging and data warehouse API 240 to forms which may be run on rDW engine 250. The files are stored on the rDW engine 250 for use at runtime.

Runtime environment 224 includes rDW engine 250 and rDW 254, which communicate via messaging/inter-process communication (IPC)/remote procedure call (RPC) 252, in runtime environment 244. Compute engine 250 includes hardware, such as DSPs, CPUs, and HACs.

The rDW 254 is a smart storage, and may include StoresQueries.bin, one or more binary files, rDW engine(s) such as a CPU and/or rDW engine, and bulk memory. The binary file is an executable file stored in memory, which may be run on the rDW engine. The rDW engine may be embedded into bulk memory. In another example, the rDW engine is separate from the bulk memory, but located close to the memory. The rDW engine receives, processes, and transmits structures with data, where the data has a specialized organization. For example, the rDW engine performs stores and queries.

Figure 5:
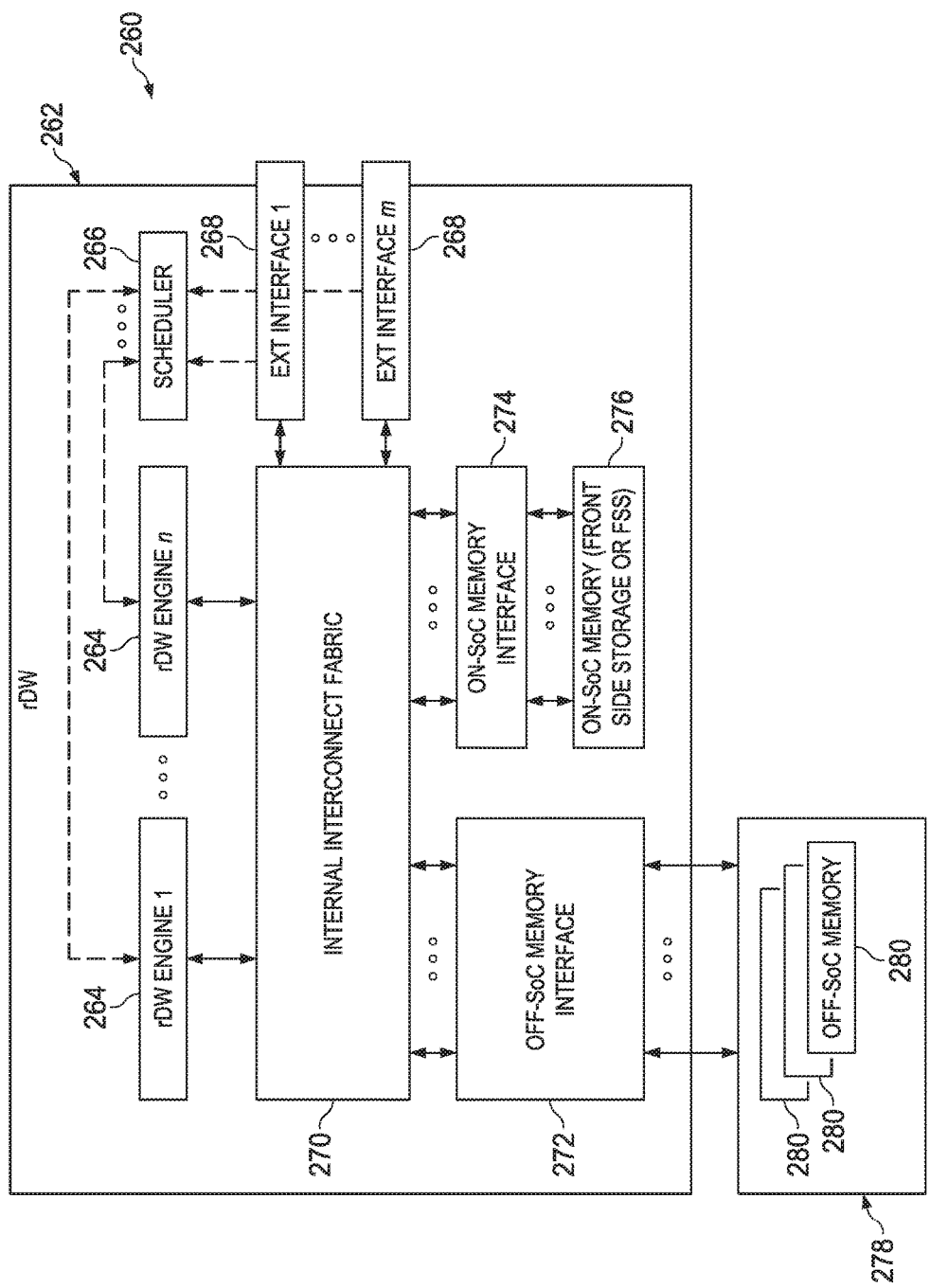
FIG. 5 illustrates a physical implementation of an embodiment rDW system.

FIG. 5 illustrates hardware architecture 260 for an rDW system. Hardware architecture 260 includes the rDW 262 and off SoC memory 278. The rDW 262 includes the rDW engines 264 which include n rDW engines, which may be coupled together. The rDW engines 264 communicate with scheduler 266, which performs scheduling for the rDW engines 264. The scheduler 266 receives store and query requests via external interfaces 268. Scheduler 266 receives the store and query requests and decides on the order to perform stores and queries. There are m external interfaces 268. The rDW engines 264 and the external interfaces 268 each communicate with internal interconnect fabric 270. The internal interconnect fabric 270 interfaces with off SoC memory interface 272 and on SoC memory interface 274. The on SoC memory interface 274 interacts with the on SoC memory 276, which may be front side storage (FSS). Also, the off SoC memory interface 272 communicates with the off SoC memory 278. The off SoC memory interface 272 prepares the data for storage. Also, the off SoC memory 278 memory may include multiple bulk memories 280.

Figure 6:
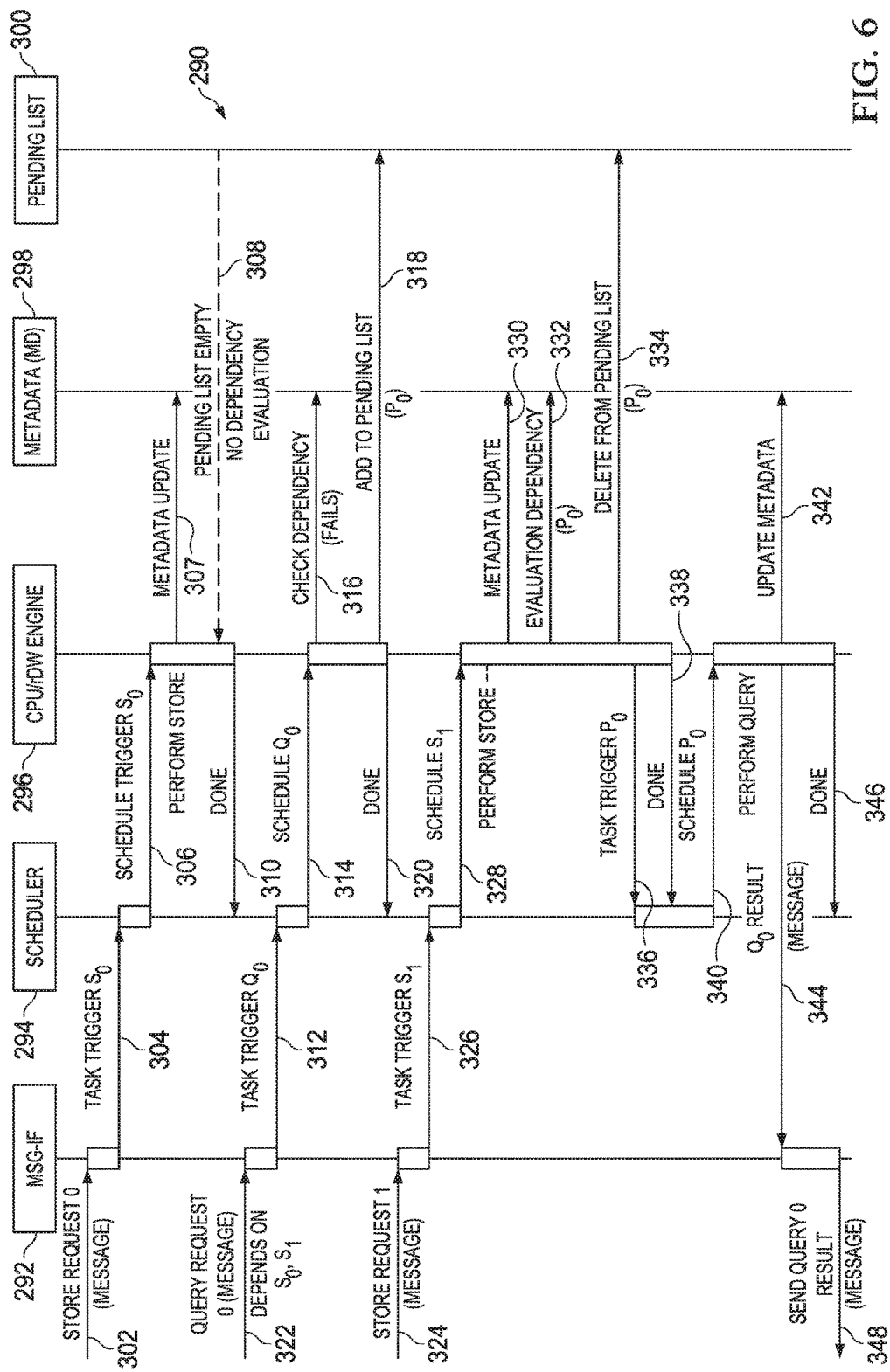
FIG. 6 illustrates a message diagram for an embodiment method of dependency resolution in an rDW system.

FIG. 6 illustrates message diagram 290 for the resolution of data dependencies in an rDW. Communications are performed between message interface (MSG-IF) 292, scheduler 294, rDW engine 296, metadata (MD) 298, and pending list 300. Message interface 292, an external interface, receives messages from producers and consumers. For example, message interface 292 receives message 302, store request 0 (S0), from a producer. After receiving message 302, message interface 292 sends task trigger 304 to scheduler 294 for store S0. Scheduler 294 then schedules store S0, and sends the corresponding schedule 306 to the rDW engine 296. The rDW engine 296 performs the store S0 according to the schedule 306. The rDW engine 296 sends a metadata update 307 to metadata 298 to update the metadata to indicate that store S0 has been performed. After the store S0 is performed and the metadata is updated, the rDW engine 296 sends DONE message 310 to scheduler 294 indicating that store S0 has been completed. Pending list 300 is empty, so a dependency for store S0 is not evaluated.

Metadata 298 messages to the rDW engine 296 the lack of a dependency evaluation in message 308. The rDW engine 296 may be a CPU or another implementation. Additional details on rDW engines are discussed in U.S. Provisional Patent Application Ser. No. 62/267,764, filed on Dec. 15, 2015, and entitled "System and Method for Data Warehouse Engine (DWE)," which application is hereby incorporated herein by reference.

After S0 has been performed, message interface 292 receives message 322 for query request 0 (Q0) from a consumer. Query Q0 depends on store S0 and on store S1. Store S0 has already been performed, but store S1 has not yet been performed. Message interface 292 sends task trigger 312 for query Q0 to scheduler 294 requesting that the scheduler 294 schedule query Q0. Scheduler 294 attempts to schedule query Q0, and sends schedule 314 for query Q0 to the rDW engine 296. The rDW engine 296 checks the dependencies of query Q0 (store S0 and store S1) in message 316 to metadata 298. The dependency check fails, because, while store S0 has been performed, store S1 has not yet been performed. The rDW engine 296 adds query Q0 to the pending list 300 with message 318 as pending task P0. Pending task P0 is pending, awaiting the completion of store S1. Also, the rDW engine 296 sends done message 320 to scheduler 294, indicating that query Q0 is presently done.

At a later time, message interface 292 receives message 324 with the store request from a producer for store S1. In one example, the producer for store S1 is the same as the producer for store S0. Alternatively, the producer for store S1 is a different CPU/rDW engine than the producer for store S0. Message interface 292 sends task trigger 326 for store S1 to scheduler 294, requesting that the scheduler 294 schedule store S1. The scheduler 294 schedules store S1, and sends the corresponding schedule 328 to the rDW engine 296. The rDW engine 296 then performs the store S1. The rDW engine 296 sends metadata update 330 to metadata 298 indicating that store S1 has been performed. Metadata 298 updates the metadata accordingly. Also, the rDW engine 296 evaluates the dependencies of pending task P0 with metadata 298 using message 332. The dependencies of pending task P0 are now satisfied, because both of its dependencies, store S0 and store S1, have been performed. Metadata 298 then deletes pending task P0 from pending list 300 with message 334, because pending task P0 is no longer pending, and is currently an active task. Additionally, the rDW engine 296 sends task trigger 336 for pending task P0 to scheduler 294. Pending task P0 is automatically triggered after store S1 has been performed. The rDW engine 296 also sends DONE message 338 to scheduler 294, indicating that store S1 has been performed. Scheduler 294 then schedules pending task P0 to be immediately performed, and sends schedule 340 for pending task P0 to the rDW engine 296. Then, the rDW engine 296 performs query Q0. The rDW engine 296 updates metadata 298 using update metadata message 342, indicating that query Q0 has been performed. Additionally, the rDW engine 296 sends message 344 with the query result for query Q0 to message interface 292. Message interface 292 then sends the query result for Q0 in message 348 to the consumer which requested the query Q0. The query result may also be sent to other consumers. Finally, the rDW engine 296 sends DONE message 346 to scheduler 294 indicating that query Q0 has been completed.

In another example, a store depends on a query.

FIG. 7 illustrates flowchart 350 for an embodiment method of storing data in an rDW. Initially, in step 352, the rDW receives data from producers. The rDW receives data for storing from one or multiple producers in parallel. The multiple producers may utilize different compute engines. Each producer may produce data in a format tailored for itself, without considering data formats of other producers.

Then, in step 354, the data is spread for storage in an rDW data repository. Data from a given producer may or may not be spread to different areas of the rDW data repository. In some examples, data is not spread.

In step 358, computation is performed. For example, filtering and/or compression may be performed.

Finally, in step 356, the data is stored as objects in the rDW data repository based on the spreading from step 354. Data may be stored in a general data structure which is not a table. In one example, objects are stored using a tree structures. Objects stored from different store requests may be stored in a non-overlapping manner. Tags may be used for storing the data. The tags are later used for retrieving the data.

FIG. 8 illustrates flowchart 360 for an embodiment method of querying data from an rDW. Initially, in step 368, the rDW receives a query request from a consumer. One query request may be received from one consumer. Alternatively, multiple query requests may be received from multiple consumers, for example in parallel. The data queried by multiple query requests may overlap.

In step 362, data is read out from an rDW data repository. Tags may be used to read out the queried data. Data from a particular query from a particular consumer may be stored in different locations. The data may be stored in an arbitrary data structure. Structures other than a table may be used. In one example, a tree structure is used to read out data from the rDW data repository. Data for a particular consumer from a particular query is gathered together from different areas of the rDW data repository. In some examples, data is not gathered from different areas of the rDW data repository.

In step 364, computation is performed. For example, filtering, arithmetic, or decompression may be performed.

Finally, in step 366, query response is output to the consumer(s). Multiple consumers may receive data from multiple queries. In one example, a unicast query result is output to one task performed by one consumer. In another example, a multicast query result is output to multiple tasks performed by a single consumer or by multiple consumers. The data may be output to consumers just as the consumers need the data. The data may be output to each consumer in a format which is most convenient for that consumer. The data read out by a single consumer may have been be produced by multiple producers.

FIG. 9 illustrates flowchart 370 for an embodiment method of automatic code generation for rDW. In step 384, the rDW system obtains input files. For example, the system may obtain data definitions, store definitions, query definitions, hardware platform architecture, application task codes, APIs, and data warehouse messaging files. Some of the files may be produced by applications. Other files are separately developed.

In step 372, the system performs rQL compilation on some of the input files obtained in step 384. The rQL compilation produces optimized and standardized codes. The output code may be in object form or in source form. Hardware and software definitions are used as the inputs for rQL compilations. Software definitions may include data definitions, store definitions, and query definitions. Data definitions are basic parameters which logically describe the content of the rDW system, including descriptions of the data formats that may be received from producers and data formats that consumers of rDW data may require. Data definitions may be defined more generally, not using a table.

For example, a non-relational hierarchical structure may be used. The store and query definitions may be defined and described as formats of data to be stored by producers and to be queried by consumers. Hardware definitions include definitions for various hardware components, such as DSP definitions, CPU definitions, HAC definitions, and rDW engine definitions. Source-to-source compilation may be performed. In another example, binary compilation is performed. In one example, the definitions are converted from an abstract language to a more common language, such as C/C++, to create a header file. Data warehouse application messaging structures and data warehouse instructions may be produced. The data warehouse instructions may include separate files for stores and queries. Alternatively, the same file is used for stores and queries.

In step 374, a DSP/CPU toolchain is applied. The data warehouse application message structures produced in step 372 and application task codes obtained in step 384 are converted to forms to be directly used by the DSP/CPU engine at runtime. Also, data warehouse messaging and data warehouse API files are converted to suitable forms for use by the DSP/CPU engine. The DSP/CPU engine may include hardware, such as DSPs, CPUs, and/or HACs.

Next, in step 386, files produced in step 374 are loaded on processors of the DSP/CPU engine.

Then, in step 376, computations are performed in real time on the DSP/CPU engine. At runtime, the DSP/CPU engine communicates with the rDW using defined messages.

In step 380, the rDW engine toolchain is applied to data warehouse instructions which have been generated in step 380. Step 380 is performed before runtime. The instructions are converted to a form to be used by the rDW during runtime.

Then, in step 388, the files converted in step 380 are loaded on the rDW.

Next, in step 382, the rDW is uses the loaded files at runtime in real-time. Also, the rDW communicates with the rDW engine using defined messages.

FIG. 10 illustrates flowchart 390 for an embodiment method of scheduling stores and queries of an rDW. In step 392, the scheduler receives a task trigger. The task trigger may be for a store or a query, and received from a message interface, or for a pending task, and received from an rDW engine. A pending task may be a store or a query which has failed a dependency check previously, but is ready to execute after a more recent dependency check. A task trigger for a pending task may indicate that the dependencies for the pending task have been satisfied.

Then, in step 394, the task triggered in step 392 is scheduled. The pending task may be scheduled to be performed immediately. Stores and queries may be scheduled immediately or for a future time. Store and query requests from multiple producers and consumers are coordinated. The schedule for the triggered task is sent to an rDW engine.

In step 396, the scheduler receives a DONE message from the rDW engine. The DONE message may indicate that the scheduled task has completed, and the rDW engine is available to be assigned a new task. In another example, the DONE message indicates that the task is temporarily halted (internally replaced by a pending task, for example awaiting the completion of dependencies), and the rDW engine is free to be assigned a new task.

Figure 11:
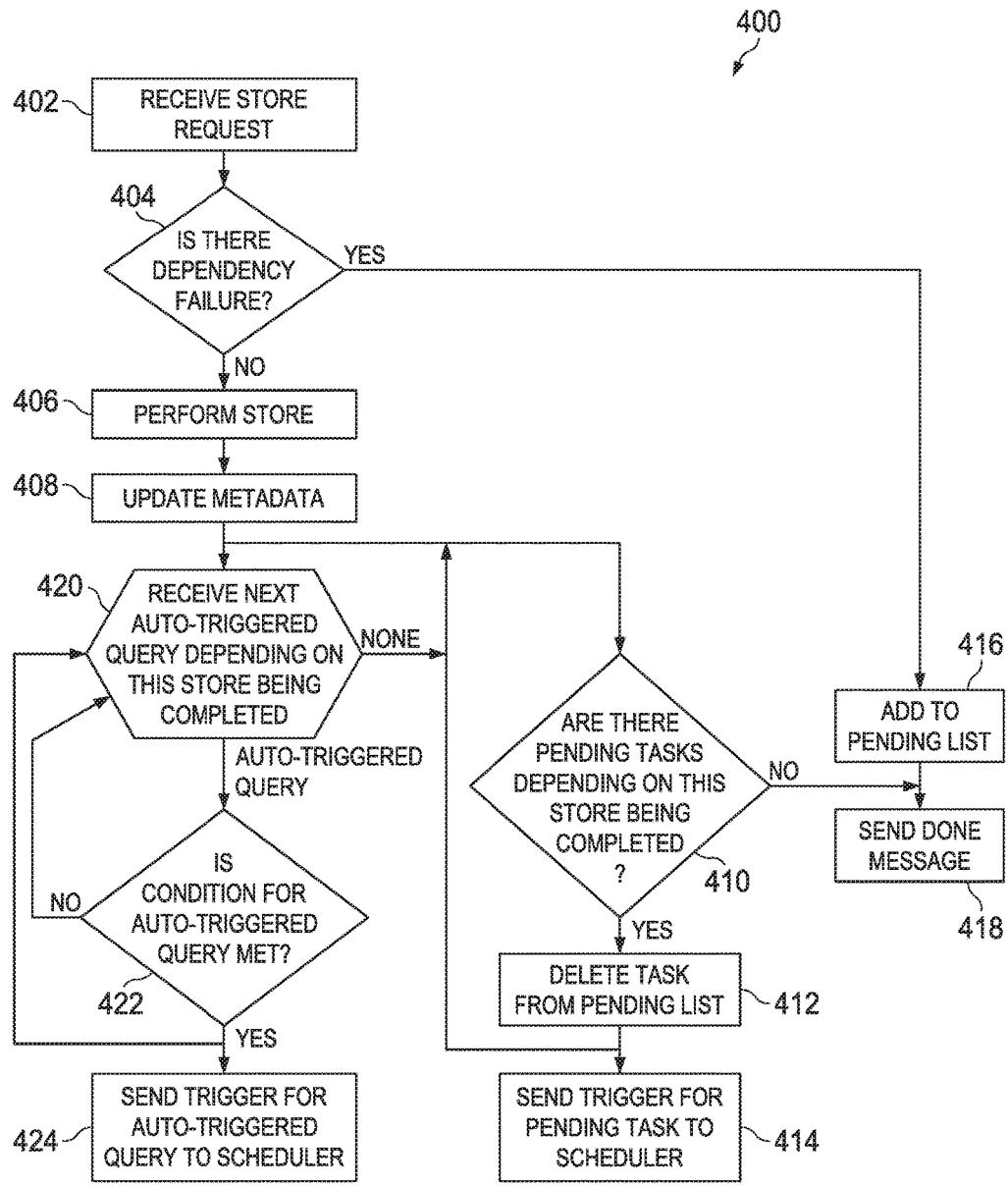
FIG. 11 illustrates a flowchart for an embodiment method of dependency resolution for an rDW for a store.

FIG. 11 illustrates flowchart 400 for an embodiment method of resolving data dependencies in an rDW for a store request. Initially, in step 402, an rDW engine receives a store request. A store request may be generated as a message.

In step 404, the processer determines whether there is a failed dependency for the store request. For example, the rDW engine checks metadata to determine whether all dependencies of the store have been completed. When all dependencies of the store have been completed, there is no dependency failure. On the other hand, when at least one dependency has not been completed, there is dependency failure. When there is no dependency failure, the rDW engine proceeds to step 406. When there is a dependency failure, the rDW engine proceeds to step 416.

In step 416, which is reached when there is dependency failure, the rDW engine adds the received store to the pending list. This indicates that the store is awaiting the completion of another task that must be completed before the received store task can be performed. The received store is converted to a pending task.

The rDW engine sends a DONE message to the scheduler in step 418. The DONE message indicates that no further work can be performed for the received store task at the current time, and the rDW engine is available to be assigned a new task.

In step 406, the rDW engine performs the store. Data is stored in an rDW data repository.

In step 408, the rDW engine updates the metadata to indicate that the store has been performed. The rDW engine proceeds to step 410. Simultaneously, the rDW engine proceeds to step 420.

In step 410, the rDW engine examines the pending list to determine whether there are any pending tasks which depend on the store being completed in step 406. When there are pending tasks which depend on this store being completed, the rDW engine proceeds to step 412. On the other hand, when there are no pending tasks which depend on this store being completed, the rDW engine proceeds to step 418, and sends a DONE message.

In step 412, the rDW engine deletes the store task from the pending list. The rDW engine returns to step 410 to again determine whether there are pending tasks depending on this store being completed. Simultaneously, the rDW engine proceeds to step 414.

In step 414, the rDW engine sends a trigger for the pending task to the scheduler. Upon triggering the pending task to be scheduled, the scheduler will schedule this task similarly to an external query/store request.

In step 420, the rDW engine consults the metadata to determine the next auto-triggered query which depends on this store being completed. When there is none, the rDW engine proceeds to step 410. On the other hand, when there is an auto-triggered query, the rDW engine proceeds to step 422.

In step 422, the rDW engine determines whether a condition for an auto-triggered query is met. Whether or not a condition for an auto-triggered query is met, the rDW engine proceeds to step 420. When a condition for an auto-triggered query is met, the rDW engine proceeds to step 424.

In step 424, the rDW engine sends a trigger for the auto-triggered query to the scheduler.

Figure 12:
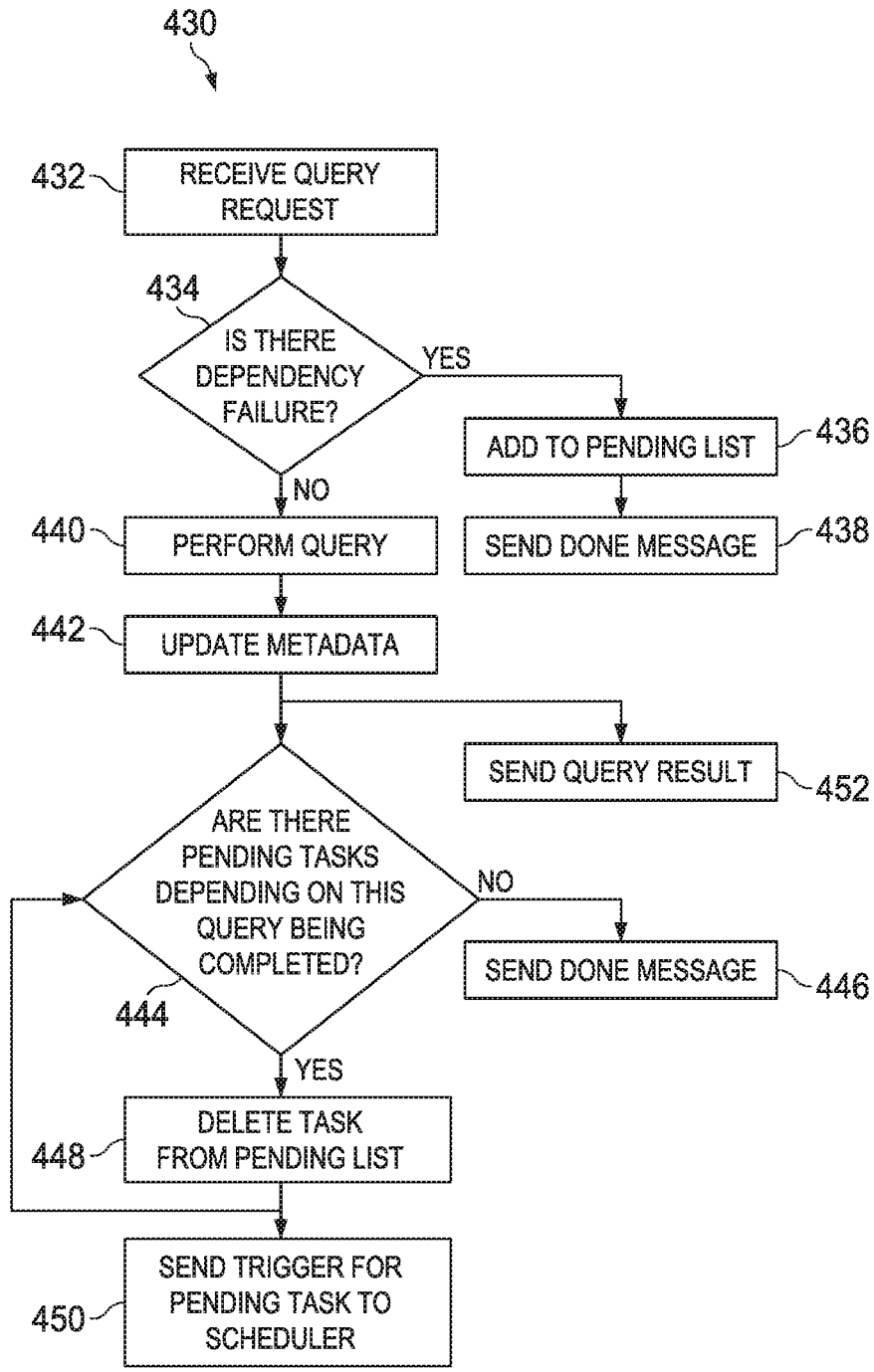
FIG. 12 illustrates a flowchart for an embodiment method of dependency resolution for an rDW for a query.

FIG. 12 illustrates flowchart 430 for an embodiment method of resolving data dependencies in an rDW for a query request. Initially, in step 432, an rDW engine receives a query request from a scheduler. In one example, the query request is generated from message. In another example, the query request is auto-triggered.

In step 434, the processer determines whether there is a failed dependency for the quer. For example, the rDW engine checks metadata to determine whether all dependencies of the query have been completed. When all dependencies of the query have been completed, there is no dependency failure. On the other hand, when at least one dependency has not been completed, there is dependency failure. When there is no dependency failure, the rDW engine proceeds to step 440. When there is a dependency failure, the rDW engine proceeds to step 436.

In step 436, which is reached when there is dependency failure, the rDW engine adds the query task to the pending list. This indicates that the query is awaiting the completion of another task that must be completed before the received task can be performed. The received query is converted to a pending task.

The rDW engine sends a DONE message to the scheduler in step 438. The DONE message indicates that no further work can be performed for the received query task at the current time, and the rDW engine is available to be assigned a new task.

In step 440, the rDW engine performs the query. Data is retrieved from the rDW data repository.

In step 442, the rDW engine updates the metadata to indicate that the query has been performed. The rDW engine proceeds to step 444. Simultaneously, the rDW engine proceeds to step 452 to send a query result.

In step 452, the rDW engine sends a query result message. The result message includes the data from the query.

In step 444, the rDW engine examines the pending list to determine whether there are any pending tasks which depend on the query being completed in step 440. When there are pending tasks which depend on this query being completed, the rDW engine proceeds to step 448. On the other hand, when there are no pending tasks which depend on this query being completed, the rDW engine proceeds to step 446.

In step 448, the rDW engine deletes the query from the pending list. The rDW engine returns to step 444 to again determine whether there are pending tasks depending on this store or query being completed. Simultaneously, the rDW engine proceeds to step 450.

In step 450, the rDW engine sends a trigger for the pending query to the scheduler. Upon triggering the pending task to be scheduled, the scheduler will schedule this task similarly to an external query/store request.

In step 446, the rdW engine sends a DONE message.

The rDW engine sends a DONE message in steps 418, 438, and 446. The DONE message indicates that the store or query task has been completed and the rDW engine is available to be assigned a new task.

An embodiment involves smart storage in real-time SoC, for example in a SoC for baseband processing. An embodiment uses store and query messages, for example with labels or tags storeId and qureyId, respectively, to access bulk memory via abstract smart storage operations, increasing the portability among SoC generations. An embodiment store and query definition explicitly defines data semantics, enabling the automaton of the organization of the data. Accesses to data in the bulk memory may be optimally scheduled. An embodiment query provides control for pre-fetching only the data needed for a computation.

Stores and queries in an embodiment rDW enable implicit on-the-fly data reorganization during both stores and queries. Also, an embodiment rQL compiler reduces the engineering effort involved in hand writing code, increasing engineering productivity while generating standardized codes that are optimized for accessing bulk memories. An embodiment rDW store and query messaging interface eliminates global addressing to access bulk memories. Additionally, an embodiment rDW store and query method enables the scheduling discipline and controlled arbitration based on scheduling criteria that satisfy SLAs.

An embodiment rDW leads to SoC development with accesses to data in bulk memories. An rDW might be developed only once, instead of at each SoC generation. The development and updated of an rDW may be decoupled from the development and updating of the SoC. An embodiment reduces non-recurring engineering (NRE) and bill of materials (BOM) for hardware development. An embodiment rDW also has a low NRE for software development. Different applications may be developed, debugged, and tested independently, while sharing the rDW for the data in bulk memory.

An embodiment rDW provides differentiated hardware and middleware architecture. Also, an embodiment reduces compute engine stall cycles and increases off-chip bandwidth utilization, leading to a reduction in SoC power and overall cost reduction from lower maintenance costs. Embodiments may be incorporated into products utilizing bulk memories. An embodiment increases software productivity by leveraging automation. Automated codes may be generated for data movement and data reorganization. Automated data management may be used in bulk memory. API standardizations may be leveraged to reuse code. Also, compute engine efficiency may be improved by reducing stalls, improving cache efficiency, and providing simple HACs with the ability to directly access complex data structures. An embodiment simplifies DDR memory control while increasing bandwidth utilization to bulk storage. An embodiment reduces SoC power by decreasing power hungry DDR-physical layer (PHY) activity.

Tables 1 and 2 illustrate bandwidth utilization in a real-time data warehouse. Table 1 illustrates direct access to DDR and Table 2 illustrates access to DDR via an rDW. The increase in bandwidth utilization to off-chip bulk memories, such as DDR, depends on the application accesses profile.

TABLE 1

| Task Name | Actual Bytes Needed | #DDR Accesses BC4 | #DDR Accesses BL8 | DDR Cycles Consumed | Bytes Fetched | DDR BW Utilization |
|---|---|---|---|---|---|---|
| Case-Study-1 | 896 | 56 | 0 | 224 | 1792 | 50.0% |
| Case-Study-2 | 1281 | 347 | 0 | 1388 | 11,104 | 11.5% |
| Case-Study-3 | 478 | 97 | 0 | 388 | 3104 | 15.4% |
| Case-Study-4 | 231 | 73 | 0 | 292 | 2336 | 9.9% |
| Case-Study-5 | 5447 | 531 | 0 | 2124 | 16,992 | 32.1% |
| Aggregate (Total/Avg) | 8,333 | | | 4416 | 35,328 | 23.6% |

TABLE 2

| Task Name | Actual Bytes Needed | #DDR Accesses BC4 | #DDR Accesses BL8 | DDR Cycles Consumed | Bytes Fetched | DDR BW Utilization | Improvement factor |
|---|---|---|---|---|---|---|---|
| Case-Study-1 | 896 | 28 | 0 | 112 | 896 | 100.0% | 2.0 |
| Case-Study-2 | 1281 | 30 | 34 | 392 | 3136 | 40.8% | 3.5 |
| Case-Study-3 | 478 | 33 | 1 | 140 | 1120 | 42.7% | 2.8 |
| Case-Study-4 | 231 | 14 | 3 | 80 | 640 | 36.1% | 3.7 |
| Case-Study-5 | 5447 | 19 | 152 | 1292 | 10,336 | 52.7% | 1.6 |
| Aggregate (Total/Avg) | 8333 | | | 2016 | 16,128 | 51.7% | |

Pre-defining formats of data to be stored and queried using rQL may allow static determination of an optimal organization and management of data in bulk memory. Also, an embodiment rQL may provide messaging structures for encoding and decoding message payloads and data. An embodiment may reduce stall cycles for a DSP/CPU. Additionally, an embodiment accesses off-chip bulk memories, which may be optimized, increasing off-chip bulk memory bandwidth utilization.

Table 3 illustrates the reduction in stall cycles.

TABLE 3

| | Total Cycle Counts | | Improvement | |
|---|---|---|---|---|
| Task Name | Direct Access | Access via rDW | Cycle Count | % |
| Case-Study-1 | 107776 | 95132 | 12644 | 11.7% |
| Case-Study-2 | 5876 | 2980 | 2896 | 49.3% |
| Case-Study-3 | 25388 | 8205 | 17183 | 67.7% |
| Case-Study-4 | 33142 | 10124 | 23018 | 69.5% |
| Case-Study-5 | 31493 | 15242 | 16251 | 51.6% |

An embodiment store and query mechanism embeds data semantics which are used to auto-manage storage and retrievals of data in bulk memory. An embodiment mechanism defines data reorganization of arbitrary numbers of data items each having arbitrary sizes and locations, enhancing flexibility and generality. Data reorganization may use scatter/gather. An embodiment does not use global direct memory access. In an embodiment, an rDW operates concurrently with other compute engines to improve compute engine utilization. In an embodiment, on-the-fly data reorganization reduces memory volume and improves access efficiency, for example by reducing cache misses. Embodiments operate in real time systems for real time applications.

An embodiment may be used in scalable distributed real-time data warehouse (sdrDW). Additional details on automated tooling infrastructure and query/store APIs are discussed in U.S. Provisional Patent Application Ser. No. 62/239,641, filed on Oct. 9, 2015, and entitled "Scalable Distributed Real-Time Data Warehouse (sdrDW) for Baseband Processing," which application is hereby incorporated herein by reference.

Figure 13:
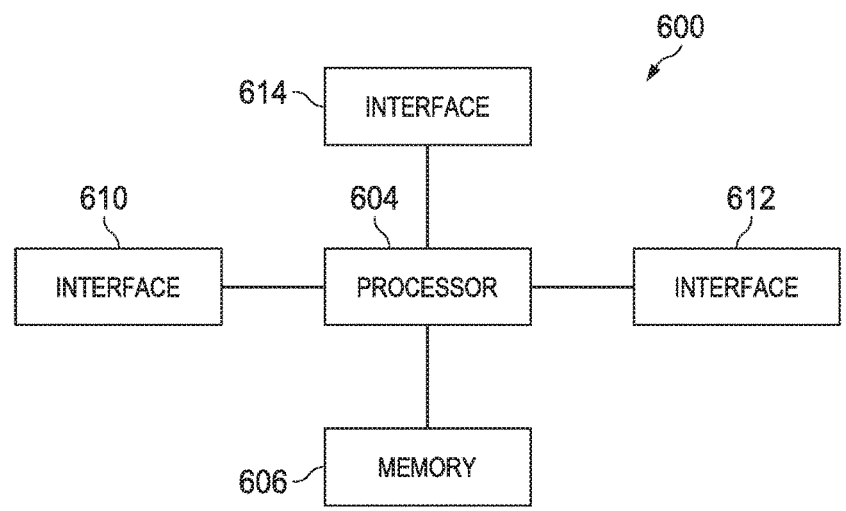
FIG. 13 illustrates a block diagram of an embodiment processing system.

FIG. 13 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 13. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 13, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 14:
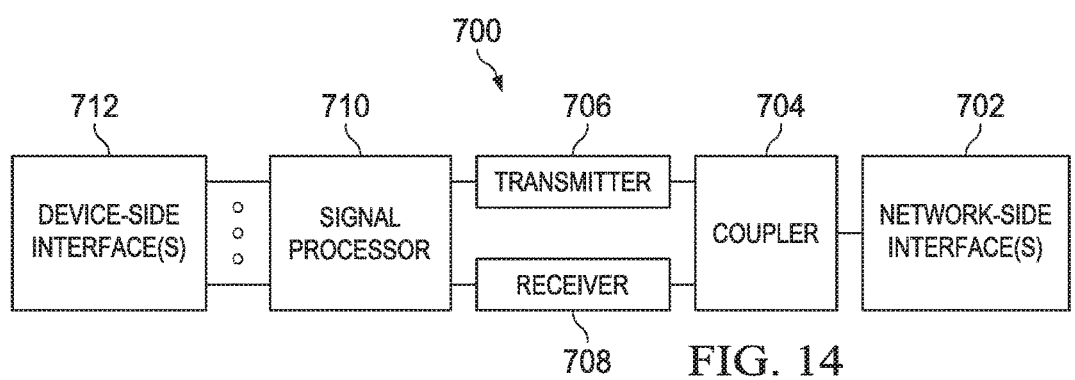
FIG. 14 illustrates a block diagram of an embodiment a transceiver.

In some embodiments, one or more of the interfaces 610, 612, 614 connects the processing system 600 to a transceiver adapted to transmit and receive signaling over the telecommunications network. FIG. 14 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a real-time data warehouse (rDW) comprising a plurality of engines and a scheduler, the method comprising:
   receiving, by the scheduler of the rDW, a first store request including a first dataset from a first task, wherein the rDW further comprises at least one on-SoC memory, at least one off-SoC memory, and the on-SoC memory locations and the off-SoC memory locations being accessible to the plurality of rDW engines, each of the plurality of rDW engines being a separate physical processor;
   spreading, by a first one of the plurality of rDW engines, the first dataset to produce a first plurality of non-overlapping objects comprising a first object and a second object in a general object format, wherein the spreading is according to a rDW store/query definition (rQD) implemented in a real-time query language (rQL); and
   storing, by the first rDW engine, the first object in a first memory location of the rDW and the second object in a second memory location of the rDW, each of the first memory location and the second memory location being one of the on-SoC memory locations of the rDW and one of the off-SoC memory locations of the rDW.

2. The method of claim 1, wherein storing the first object in the first memory location of the rDW comprises storing the first object in a general data structure at the first memory location.

3. The method of claim 1, further comprising:
receiving, by the scheduler of the rDW, a second store request from a second task that includes a second dataset, the second store request received after the first store request;
spreading, by the first rDW engine or the second rDW engine of the rDW, the second dataset to produce a second plurality of objects; and
storing, by the first rDW engine or the second rDW engine of the rDW, the second plurality of objects in memory locations of the rDW.

4. The method of claim 1, further comprising:
receiving, by the scheduler of the rDW, a query; and
reading, by the first rDW engine or the second rDW engine of the rDW, at least a portion of the first object from the first memory location of the rDW in accordance with the query to produce a query result, and based thereon transmitting, by the first rDW engine or the second rDW engine of the rDW, the query result to at least one task.

5. The method of claim 4, wherein transmitting the query result to at least one task comprises multicasting the query result to multiple tasks.

6. The method of claim 1, further comprising, after storing the first object:
determining, by the first rDW engine or a second rDW engine of the rDW, that a trigger condition of an auto-triggered query has been satisfied, and based thereon sending a task for the auto-triggered query to a scheduler of the rDW;
receiving, by the first rDW engine or the second rDW engine of the rDW, an auto-triggered query schedule for the auto-triggered query response to transmitting the task; and
performing, by the first rDW engine or the second rDW engine of the rDW, the auto-triggered query in accordance with the auto-triggered query schedule.

7. The method of claim 1, further comprising sending a store response.

8. A method performed by a real-time data warehouse (rDW) comprising a plurality of engines and a scheduler, the method comprising:
receiving, by the scheduler of the rDW, a first query, wherein the rDW further comprises at least one on-SoC memory, at least one off-SoC memory, and the on-SoC memory locations and the off-SoC memory locations being accessible to the plurality of rDW engines, each of the plurality of rDW engines being a separate physical processor;
gathering, by a first one of the plurality of rDW engines, a first object from a first memory location of the rDW and a second object from a second memory location of the rDW in accordance with the first query to produce a first query result according to a rDW store/query definition (rQD) implemented in a real-time query language (rQL); and
transmitting, by the first rDW engine or a second one of the plurality of rDW engines, the first query result to at least one task.

9. The method of claim 8, wherein reading the first object from the first memory location of the rDW comprises reading the first object from a general data structure at the first memory location.

10. The method of claim 8, further comprising:
receiving, by the first rDW engine or a second rDW engine of the rDW, a second query;
reading, by the first rDW engine or the second rDW engine of the rDW, a second plurality of objects from memory locations of the rDW in accordance with the second query to produce a second query result; and
transmitting, by the rDW, the second query result.

11. The method of claim 10, wherein the second query result is multicast to multiple tasks.

12. A method for generating system-on-chip (SoC) data and memory management programs, the method comprising:
obtaining, by a compiler executing on a processor, software definitions;
obtaining, by the compiler executing on the processor, hardware definitions;
performing, by the compiler executing on the processor, real-time Query Language (rQL) compilation on the software definitions and the hardware definitions to produce data warehouse instructions and data warehouse application structures for a real-time data warehouse (rDW) that includes one or more rDW engines, on-SoC memory including one or more on-SoC memory locations, and off-SoC memory including one or more off-SoC memory locations, both the on-SoC memory locations and the off-SoC memory locations being accessible to the one or more rDW engines, each of the one or more rDW engines being a separate physical processor;
applying, by the compiler executing on the processor, a toolchain to the data warehouse instructions to produce a binary file; and
loading, by the compiler executing on the processor, the binary file on at least a first one of the one or more rDW engines of the rDW.

13. The method of claim 12, further comprising running, by the first rDW engine, the binary file during runtime, comprising storing a first object in memory and querying a second object from the memory.

14. The method of claim 12, further comprising:
applying a toolchain to the data warehouse applications structures, application task codes, and data warehouse applications programming interfaces (APIs) to produce compute code; and
loading the compute code on a compute engine.

15. A method for system-on-chip (SoC) data and memory management, the method comprising:
receiving, by a first real-time data warehouse (rDW) engine of a rDW from a scheduler of the rDW, a first task schedule for a first task, the first task depending on a second task, the rDW including one or more rDW engines that include at least the first rDW engine, on-SoC memory including one or more on-SoC memory locations, and off-SoC memory including one or more off-SoC memory locations, both the on-SoC memory locations and the off-SoC memory locations being accessible to the plurality of rDW engines, each of the plurality of rDW engines being a separate physical processor; and
determining, by the first rDW engine of the rDW, whether the second task has been completed and based thereon adding the first task to a pending list as a pending task when the second task has not been completed and performing the first task when the second task has been completed.

16. The method of claim 15, further comprising:
receiving, by the first rDW engine or a second rDW engine of the rDW from the scheduler, a second task schedule for the second task;
performing the second task after receiving the second task schedule; and
updating metadata of the second task after performing the second task.

17. The method of claim 16, further comprising, after performing the second task:
transmitting, by the first rDW engine or the second rDW engine to the scheduler, a task trigger for the pending task;
receiving, by the first rDW engine or the second rDW engine from the scheduler, a pending task schedule after transmitting the task trigger for the pending task;
performing, by the first rDW engine or the second rDW engine of the rDW, the pending task after receiving the pending task schedule; and
removing, by the first rDW engine or the second rDW engine of the rDW, the pending task from the pending list.

18. The method of claim 15, wherein the first task is a query, wherein performing the first task comprises producing a query result, the method further comprising transmitting, by the rDW to a message interface, the query result.

19. A real-time Data Warehouse (rDW) system comprising:
one or more rDW engines each of which being a separate physical processor;
on system-on-chip (on-SoC) memory coupled to the one or more rDW engines, the on-SoC memory including on-SoC memory including one or more on-SoC memory locations that are accessible to the one or more rDW engines; and
a scheduler coupled to the one or more rDW engines.

20. The rDW system of claim 19, further comprising:
a first external interface coupled to the scheduler; and
a second external interface coupled to the first external interface.

21. The rDW system of claim 20, further comprising:
an on-SoC memory interface coupled to the on-SoC memory; and
an internal interconnect fabric coupling the one or more rDW engines to both the on-SoC memory and the scheduler, the internal interconnect fabric further coupling the scheduler to the first external interface.

22. The rDW system of claim 21, further comprising:
off system-on-chip (off-SoC) memory coupled to the one or more rDW engines, the off-SoC memory including off-SoC memory locations that are shared by the one or more rDW engines
an off-SoC memory interface coupled to the off-SoC memory.

* * * * *